United States Patent [19]

Grahame

[11] Patent Number: 4,480,285

[45] Date of Patent: Oct. 30, 1984

[54] CAPACITOR

[75] Inventor: Frederick W. Grahame, Glens Falls, N.Y.

[73] Assignee: General Electric Company, Hudson Falls, N.Y.

[21] Appl. No.: 449,896

[22] Filed: Dec. 15, 1982

[51] Int. Cl.³ .......................... H01G 1/14; H01G 4/06
[52] U.S. Cl. ..................................... 361/306; 361/313
[58] Field of Search ....................... 361/273, 303–315, 361/323, 324

[56] References Cited

U.S. PATENT DOCUMENTS

| 3,012,176 | 12/1961 | Williams et al. | 361/313 |
|---|---|---|---|
| 3,248,620 | 4/1966 | Haft et al. | 361/313 |
| 3,705,336 | 12/1972 | Kalstein | 317/260 |
| 3,740,623 | 6/1973 | Toro | 361/304 |
| 3,987,348 | 10/1976 | Flanagan et al. | 361/314 X |
| 4,054,937 | 10/1977 | Mandelcorn et al. | 361/315 X |
| 4,344,105 | 8/1982 | Holtzman et al. | 361/328 |
| 4,345,298 | 8/1982 | Grahame | 361/273 |

FOREIGN PATENT DOCUMENTS 1057097 10/1953 France .............................. 361/303
960562 6/1964 United Kingdom .

Primary Examiner—Donald A. Griffin
Attorney, Agent, or Firm—James J. Lichiello; Arthur E. Bahr

[57] ABSTRACT

An electrical capacitor is disclosed comprising a doubly metallized electrode and a metal foil electrode interleaved with a dielectric material. In a preferred embodiment the electrodes and dielectric comprise strips formed into a roll wherein, at each end, one edge of an electrode protrudes beyond the edge of the other electrode and defines a planar roll end. A coating of metal is applied at each roll end to form electrical connections with the protruding electrode edges. The edge of the other electrode is protected from stray particles of the coating applied at each end by a barrier comprising a selected recess distance and/or shielding provided by the dielectric strip.

21 Claims, 6 Drawing Figures

CAPACITOR

The present invention relates in general to electrical capacitors and more particularly to capacitors having lead connections in the form of metal coatings applied at each capacitor end wherein means are provided to protect the non-connected electrode at each end from stray particles of the applied coating.

BACKGROUND OF THE INVENTION

In order to form electrical connections with the electrodes of a capacitor, particularly a capacitor of the kind wherein a laminate comprising interleaved electrode and dielectric strips is formed as a roll, various means are used in the prior art. For example, tap straps may be used. Another well-known technique is schooping, which is essentially a process whereby a conductive coating, usually a molten metal such as aluminum or zinc, is sprayed or otherwise applied to exposed portions of the capacitor electrodes to make a connection therewith. It is not uncommon for metal particles from the spray to penetrate into the capacitor during the schooping process. If these particles contact the opposite electrode, i.e., the electrode with which contact is not desired at the particular end of the capacitor, a short may result which can cause capacitor failure to occur. Additionally, even if no actual contact is made, the mere presence of the schooping particles near the capacitor end provides conductive material that increases the likelihood of arc-over from one electrode to another.

Where an electrode consists of a dielectric strip whose surfaces are metallized, short circuits do not as a rule occur if schooping is used at the roll ends. This is due to the self-clearing capability of such an electrode, which causes the stray metal particles coming into contact therewith to vaporize a small portion of the metallized surface. Such electrodes are thus cleared almost instantaneously, preventing capacitor failure. However, where an electrode consists of a metal foil, no such self-clearing capability exists and a short circuit may develop when a stray particle of the conductive coating makes contact therewith.

Although a sprayed metal connection at both ends of a rolled capacitor is preferred for reasons of economy, persistent failures due to the above-mentioned shorting have heretofore limited the use of schooping to establish electrical connections with the electrodes. In the prior art, a commonly used technique for minimizing the entry of the particles into the roll comprises schooping the roll ends at an oblique angle, i.e. to spray the molten particles obliquely onto the roll ends. Experience has shown that capacitor failure is not significantly reduced or eliminated with this technique.

OBJECTS OF THE INVENTION

Accordingly, it is a primary object of the present invention to provide a new and improved capacitor wherein the foregoing problems are minimized or eliminated.

It is another object of the present invention to provide a new and improved capacitor using coated metal connections on the electrodes, wherein electrode shorting due to the coating or its application is eliminated or minimized.

It is a further object of the present invention to provide a new and improved laminated strip capacitor wherein electrode shorting failures attributable to sprayed metal capacitor lead connections are minimized by offsetting the strip electrodes with respect to each other such that their longitudinal edges which are not used for lead connections are recessed within the capacitor.

It is an additional object of the present invention to provide a new and improved laminated strip capacitor using sprayed metal connections wherein means are provided for protecting any electrode which lacks a self-clearing capability from stray metal particles deposited by the spraying process on the nearby capacitor end.

It is still another object of the present invention to provide a new and improved laminated strip capacitor containing at least one metal foil electrode, wherein shorting failures due to sprayed lead connections are minimized or eliminated.

SUMMARY OF THE INVENTION

The foregoing and other objects of the invention, together with the advantages thereof, are realized by providing a multi-layer capacitor, the electrodes of which are offset with respect to each other so as to facilitate schooping to selected electrode edges only. For example, a pair of strip electrodes is interleaved with dielectric strips to form a laminate which is wound to provide a capacitor in roll form. At each of the roll ends the longitudinal edge of one of the electrodes is exposed, while the edge of the other electrode is recessed within the body of the capacitor. The exposed electrode edge defines a plane to which a metal coating is applied, e.g. by schooping or spraying, to establish an electrical connection to the electrode in question. The recessed electrode edge is protected from contact with stray metal particles that penetrate the roll. In this context it is to be noted that electrode recessing per se has been used before for the purpose of preventing arc-over problems in capacitors that use tap straps. Under these conditions, the recess margin may be on the order of ⅛ inch or less for a 1000 volt capacitor. In accordance with the present invention, however, the recess distance is made sufficiently large to prevent metal particles from reaching the recessed electrode. Alternatively, or in addition to the above-described recessing, a portion of the dielectric strip is positioned within the recess distance between the recessed electrode and the roll end that is being schooped. Both techniques are effective to prevent contact with penetrating stray metal particles and thus capacitor failure is minimized or avoided entirely.

The foregoing objects of the present invention, together with the features and advantages thereof, will be better understood from the following detailed description of the invention when read in connection with the drawings in which applicable reference numerals have been carried forward.

DETAILED DESCRIPTION OF THE INVENTION

Figure 1:
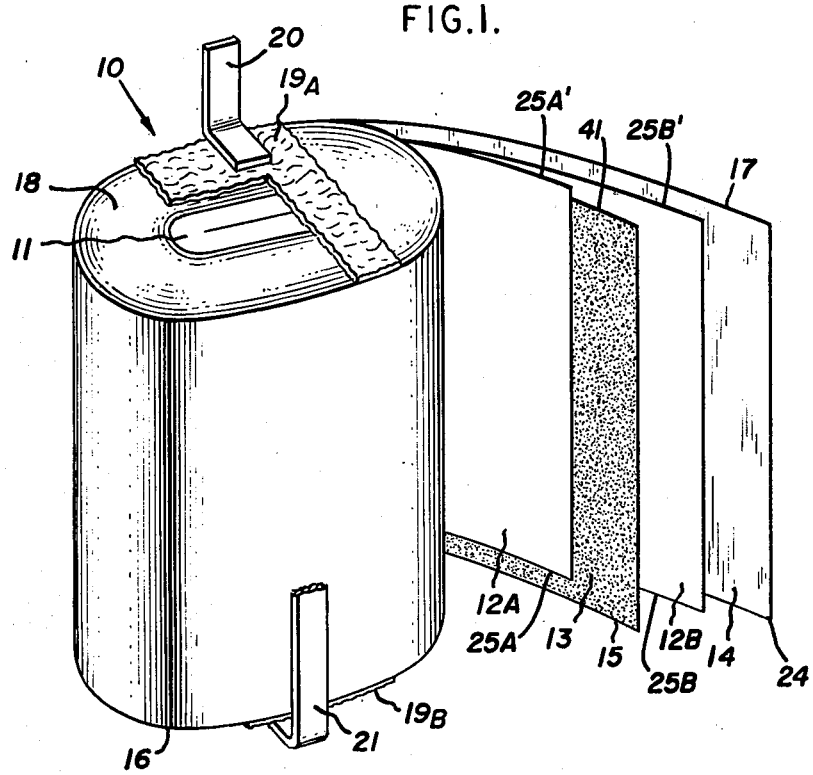
FIG. 1 is a perspective view of a roll capacitor illustrative of the principles of the present invention.
Figure 2:
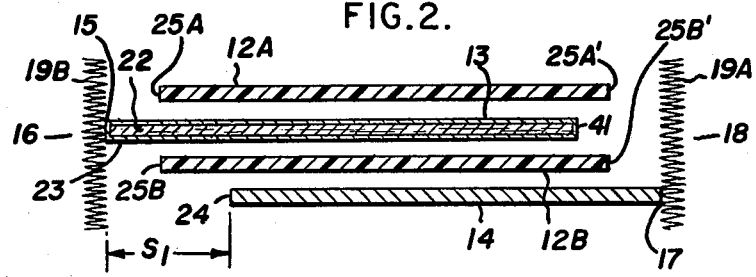
FIG. 2 is a partial cross-sectional view of the apparatus of FIG. 1 in accordance with one embodiment of the invention.

Referring now to FIGS. 1 and 2, the illustrated exemplary capacitor roll 10 comprises a roughly elliptical core member 11 on which there are disposed strip electrodes 13 and 14 interleaved with synthetic resin strips or layers 12A and 12B, each of the electrodes comprising at least one electrode layer. Roll 10 and its method of fabrication are described in greater detail in U.S. Pat. No. 4,345,298, which is assigned to the assignee of the present invention. In the aforesaid patent there is described the method of winding a capacitor on a stiff cylindrical member 11 and thereafter flattening the roll and core to the configuration shown in FIG. 1 of this invention.

In a preferred embodiment, electrode 13 comprises a doubly metallized paper electrode layer and electrode 14 comprises a self-supporting aluminum foil electrode layer. As best shown in FIG. 1, roll 10 is wound with the electrode layers in offset, or staggered, relationship to each other in an axial direction, so that longitudinal edge 15 of electrode layer 13 protrudes beyond recessed edge 24 of foil 14. Edge 15 defines a plane which constitutes one end 16 of roll 10. At the opposite roll end 18, longitudinal edge 17 of electrode layer 14 likewise defines a plane and edge 41 of electrode 13 is recessed relative thereto. In an optional embodiment, foil strip electrode 14 could be narrower in width and have edge 17 recessed from roll end 18, resulting in a "buried foil" type of capacitor construction. Both end planes are substantially perpendicular to the axis of the roll and hence to the rolled strip. In similar manner to the opposed parallel edges of each electrode strip, each strip of dielectric material comprises opposed, parallel, longitudinal borders. Thus, strip 12A comprises borders 25A and 25A' and strip 12B comprises borders 25B and 25B'.

A conductive substance, e.g. a melted metal such as aluminum or zinc, is schooped or sprayed onto each end of the roll section to form coatings 19A and 19B respectively, each occupying only a portion of the total area of the planar roll end. Each coating establishes multiple electrical connections with the electrode edge that lies in and defines the plane of the roll end. A pair of connecting leads 20 and 21 are affixed to roll 10 in electrical contact with coatings 19A and 19B, respectively. The term "lead", as used herein, generally indicates suitable connectors between the coatings and the terminals on the capacitor casing.

If the capacitor is other than in roll form, each electrode may consist of separate multiple layers, e.g. as in a stack. In the roll shown in FIG. 1 however, each electrode is comprised of only a single electrode strip which, due to its being repeatedly wound around a core, in effect constitutes multiple layers of the same electrode. For purposes of further description, it is understood that an electrode may comprise a single layer or multiple layers, and any reference to a layer applies to the electrode as a whole; likewise, reference to the electrode applies equally to its constituent layer or layers.

As best shown in FIG. 2, the metallized paper electrode layer 13 comprises a thin, high density porous strip 22 on both surfaces of which a film of metal 23 is deposited. A number of materials may be employed for porous strip 22, including woven and non-woven polymeric materials or other porous and wicking materials, which will permit strip 23 to be permeated with a dielectric fluid. However, in practice capacitor tissue is preferred, which has a density of about 1.0 grams/cubic centimeter. Such tissue is commercially available as Kraft capacitor tissue.

Metallic film 23 covers both surfaces of porous strip 22, a combination referred to as doubly metallized paper. Preferably the metal is aluminum or zinc, which is deposited on the paper, for example by a well-known vacuum deposition process, to provide a uniform, high-purity metal film. Such films are measured in terms of their ohmic resistance per square unit of area and a range for the present invention is from about 4.0 to about 7.0 ohms per square unit of area.

The synthetic resin layers or strips 12A and 12B may each consist of a single strip or of multiple strips of one or more of the more common dielectric resins, such as polyolefins, polycarbonates and polyamines, etc., and homopolymers and copolymers thereof. However, a resin comprising electrical capacitor grade polypropylene is a preferred material for purposes of this invention. Capacitor grade polypropylene film is a higher-purity, smoother polypropylene film of enhanced dielectric characteristics.

FIG. 2 illustrates a preferred arrangement of the electrode and dielectric strips to obtain the advantage of the present invention. Coatings 19A and 19B are represented in this Figure as having a certain thickness. The thickness dimensions, as well as other dimensions shown, are not to be taken as representative of the actual dimensions of the coatings or of the various layers.

Longitudinal edge 15 is seen to be in contact with coating 19B, thus establishing an electrical connection to electrode 13. Longitudinal edge 24 of aluminum foil electrode layer 14 is spaced inwardly, i.e. recessed, with respect to edge 25B of dielectric strip 12B. At roll end 18, electrode layer 14 is seen to extend beyond dielectric strip 12B, such that its longitudinal edge 17 is positioned in contact with conductive coating 19A to establish electrical contact therewith. Thus, edge 17 defines the plane of roll end 18 in similar manner to edge 15 which defines the plane of roll end 16. If a "buried foil" construction is employed wherein edge 17 is also recessed with respect to edge 25B', the dielectric strip edges 25A' and 25B' will define the plane of roll end 18 with electrical connection being made to electrode 14 by the use of tap straps.

The described positional relationship of the respective strips permits the application of a sprayed metal coating 19B to make multiple connections to edge 15 of electrode 13. Similarly, sprayed metal coating 19B makes multiple connections with edge 17 of electrode layer 14 at roll end 18. In the preferred embodiment, both lead connections are made by means of sprayed metal coatings and the need for tap straps to the electrode layers is obviated.

The process of spraying, or schooping coating 19B onto roll end 16 may cause very small stray particles of the metal spray to propagate into the capacitor roll end to contact aluminum foil electrode layer 14, e.g. edge 24 of the latter. The depth of penetration of the molten metal particles is enhanced by the trajectory of the spray which is usually almost perpendicular to the plane of the roll end. Unless special precautions are taken, particle penetration may be substantial. If the spray particles make contact with foil 14, shorting of the capacitor electrodes may occur and partial or complete capacitor failure will result.

Thus, it is one of the features of the present invention to select the distance by which edge 24 of aluminum foil electrode layer 14 is recessed with respect to the plane of roll end 16, such that electrode layer 14 is positioned beyond the reasonably expected propagating distance of the aforesaid stray metal particles. Alternatively, or additionally, by placing a barrier between edge 24 and planar roll end 16, further protection of the foil electrode layer 14 is achieved. In the implementation illustrated in FIG. 2, the width of aluminum foil strip 14 is selected to be narrower than that of doubly metallized strip 13. Thus, edge 24 is spaced further from roll end 16 and metal particles must travel further to make contact with the edge. Clearly, this construction diminishes the available capacitance. However, it has been found that if this spacing, designated $S_1$ in FIG. 2, is in the range of about ⅜ to about 7/16 inch, i.e. in the range of distances which exceed the distance normally traveled by the molten metal spray particles, the number of capacitor failures can be markedly reduced without materially decreasing the capacitance of the capacitor. No such recess distance is required for edge 41 with respect to the plane of roll end 18 because of the self-clearing capability of metallized electrode 13 in the event stray metal particles make contact with it. However, it is possible to have a second recess distance for edge 41 if desired. Furthermore, any such predetermined recess distance would not necessarily be the same as the first predetermined recess distance, $S_1$. The second distance could be as small as the standard margins found in the prior art, i.e., roughly ⅛ inch.

Figure 3:
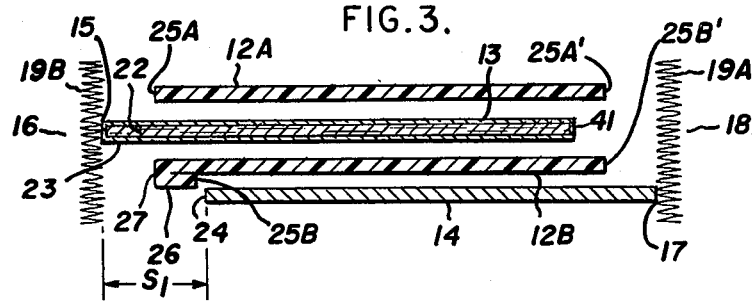
FIG. 3 is a partial cross-sectional view of the apparatus in FIG. 1 in accordance with another embodiment of the present invention.

The distance normally traveled by spray particles depends in large measure on the tightness with which roll 10 is wound and on the metal spray process used. Since these factors may not always be controllable, a barrier may additionally be desired to protect foil 14 to a greater extent from the impinging metal particles. A more effective physical barrier may be obtained by doubling over border 25B of dielectric strip 12B, up to 180°, to obtain a fold 26, as shown in FIG. 3, which extends in the direction of electrode layer 14. In a preferred embodiment of the invention fold 26 does not overlap edge 24 of the foil electrode, but lies adjacent edge 24 within distance S1, i.e. between edge 24 and metal coating 19B. The smooth unbroken edge of fold 26 provides an effective physical barrier to metal spray particle penetration. If such a fold is employed, the initial width of strip 12B will be greater than strip 12A by a distance equal to the width of the fold. Thus, after being folded over, strip 12B will be of the same width as strip 12A, with edge 27 substantially lying in a plane substantially parallel to said roll ends and including edge 25A.

The fold does not extend significantly into the roll since its primary function in this embodiment of the invention is to provide a concentric ring barrier or shield for one end of the capacitor. Specifically, this barrier provides a shield for edge 24 of the foil electrode 14 when the schooping metal is sprayed onto the nearby roll end 16. Actual capacitor tests have shown a dramatic reduction in the number of capacitor failures when the folded dielectric edge is employed.

It will be clear that fold 26 is continuous along longitudinal edge 25B of the dielectric strip 12B. It will also be apparent that no such barrier is required at the opposite roll end 18 in the illustrated embodiment of the invention. Thus, foil electrode 14 is purposely exposed at roll end 18 to establish a connection by means of schooped metal coating 19A. In the event that stray metal particles progress into roll end 18 and contact doubly metallized electrode 13, a clearing action common to metallized electrode capacitors takes place. Specifically, the metal film deposited on the metallized electrode vaporizes at the point of contact and any electrical connection is broken almost instantaneously.

It will be apparent to those skilled in the art that, although an electrode may have a self-clearing capability such as described above, whenever the electrode clears itself a small void is left on the electrode surface where the metal has vaporized. The loss of a portion of this metal film diminishes the capacitance of the capacitor and thus decreases the overall effectiveness of the capacitor. As such, it is sometimes preferable to provide a barrier, or to space the electrode beyond the range of stray particles even in capacitors wherein both electrodes are self-clearing. Accordingly, in its broadest sense, the present invention is applicable to any capacitor where lead connections are made by schooping.

Figure 4:
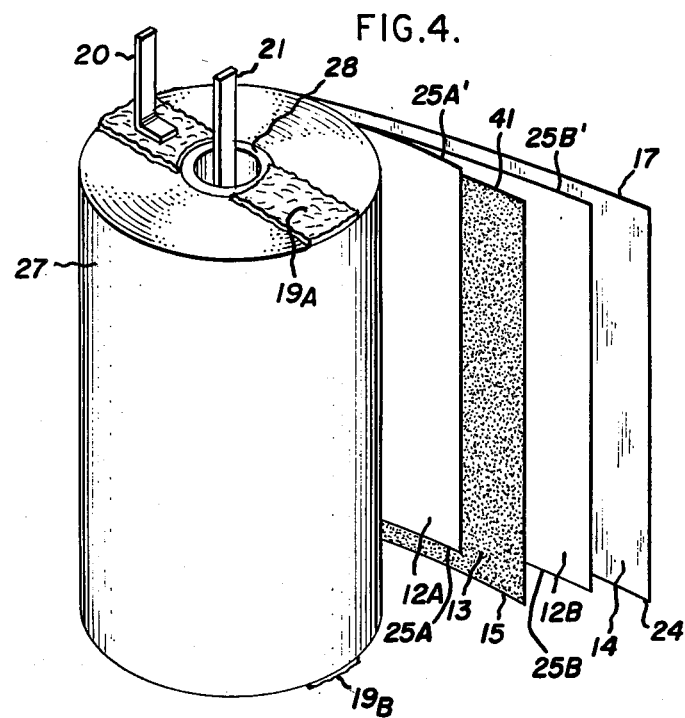
FIG. 4 illustrates a variation of the capacitor roll shown in FIG. 1.

The capacitor roll described in FIGS. 1, 2, and 3 may also take the form of a round roll 27, as illustrated in FIG. 4. As shown there, the roll is wound in a circular configuration on a cylindrical core structure 28. It is preferred that this core structure 28 have a thick wall section capable of withstanding high centripetal forces during winding. Further, it should be capable of being distorted to an oval or elliptical configuration without injury to the capacitor. A suitable core structure for this purpose comprises a paper resin material having a wall thickness of about 0.08 to 0.1 inch.

Figure 5:
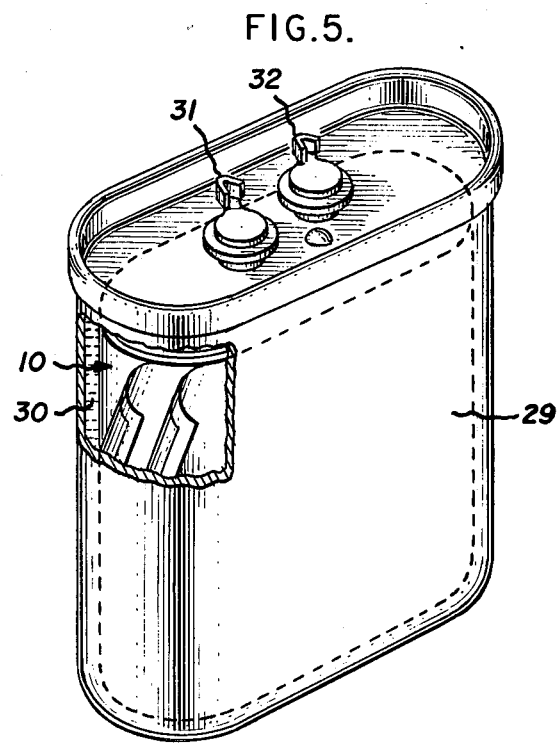
FIG. 5 illustrates the apparatus of FIG. 1 in fully assembled form.

FIG. 5 illustrates a completely assembled capacitor which uses the oval or elliptical roll structure of FIG. 1. Roll 10 is suitably inserted into a can or casing 29 and impregnated with a dielectric fluid 30. Terminals 31 and 32 on the can connect to the connecting lugs 20 and 21, respectively.

From the foregoing discussion, it will be clear that the present invention, in one embodiment, is free of tap straps. The tap straps are replaced by the metal coatings applied by the schooping process. It should be further noted that the metal coatings cover less than the total roll end area in order to facilitate dielectric liquid impregnation of the capacitor.

Figure 6:
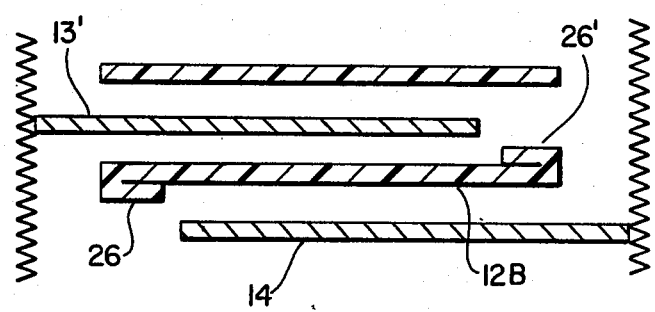
FIG. 6 is a partial cross-sectional view of the apparatus of FIG. 1 in accordance with another embodiment of the present invention.

As mentioned earlier, the folded resin strip and the relative spacing of the electrodes in the axial direction are likewise applicable to capacitors where both of the electrodes are made of metal foil. If two metal foil electrodes 14 and 13' are used, as shown in FIG. 6, both edges of the dielectric strip may be folded over, with one edge folding toward one electrode, as at fold 26, and the other edge folding toward the other electrode, as at fold 26'. Further, if two foil electrodes are used, the offset of each electrode with respect to the other may be increased or decreased depending on the distance required to protect the electrodes from stray metal particles attributable to the schooping process at the opposite ends of the roll.

In addition to the variation in the make-up of the electrodes, the geometry of the capacitor shown and described may vary without departing from the principles of this invention. In any such embodiment, the invention may be applied by folding the edge or border of an interleaved dielectric strip in a manner to protect any adjacent electrode edge from schooping performed on the nearby capacitor and to establish a connection to the opposite electrode. Additionally, the electrodes may be positioned relative to each other so as to provide sufficient spacing between one electrode edge and the area of the opposite electrode being schooped. Thus, in any capacitor where lead connections are made by schooping, spraying, or the like, the present invention is applicable to protect an electrode from stray particles attributable to the process of spraying a coating to establish a connection with the opposite electrode.

While the present invention has been disclosed with respect to particular embodiments thereof, numerous modifications, changes, equivalents, partial and complete variations and departures will now occur to those skilled in the art, all of which fall within the true spirit and scope of the invention. Therefore, it is intended that the present invention be limited only by the appended claims:

What is claimed is:

1. An electrical capacitor comprising:
   first and second opposite, substantially planar capacitor ends;
   first and second electrodes positioned between the planes of said capacitor ends;
   each of said electrodes including at least a single layer of conductive material, said layers being substantially parallel to each other and each being bounded by first and second opposite edges, said first-electrode layer being substantially normal to the plane of said first capacitor end and having its first edge disposed in said first end plane, said first edge of said second-electrode layer being recessed a first predetermined distance from said first end plane;
   a layer of dielectric material positioned between said electrode layers and substantially parallel thereto including first and second opposite borders substantially parallel to said first and second end planes respectively;
   a fold in said dielectric material including said first border, said fold being positioned substantially within said predetermined recess distance of said first edge of said second-electrode layer from said first end plane; and
   first and second electrical connecting means for connecting to said first and second electrodes respectively, at least said first connecting means comprising a conductive coating applied to said first capacitor end to make electrical contact with said first edge of said first-electrode layer;
   said predetermined recess distance having a selected magnitude, and said fold being adapted to shield said second electrode from stray particles attributable to the application of said conductive coating to said first capacitor end.

2. A capacitor as recited in claim 1 wherein said fold is positioned substantially between said coating and said first edge of said second-electrode layer spaced about 1/16 inch from said second electrode layer, said fold being from about 1/16 to about 5/16 inch in width.

3. A capacitor as recited in claim 1 wherein said second capacitor end is substantially parallel to said first capacitor end and said second edge of said second-electrode layer lies in the plane of said second capacitor end, the second edge of said first-electrode layer being recessed a second predetermined distance from said second end plane;
   said second connecting means comprising a conductive coating applied to said second capacitor end to make electrical contact with said second edge of said second-electrode layer;
   said dielectric material further comprising a second fold including said second border, said second fold being positioned substantially within said second predetermined recess distance; and
   said folds being adapted to shield said first and second electrode layers from stray particles attributable to the application of said coatings to said second and first end planes respectively.

4. A capacitor as recited in claim 3 wherein said first fold is positioned substantially between said coating on said first capacitor end and said first edge of said second-electrode layer spaced about 1/16 inch from the latter layer and said second fold is positioned substantially between said coating on said second capacitor end and said second edge of said first-electrode layer spaced about 1/16 inch from the latter layer.

5. A capacitor as recited in claim 4 wherein each of said folds is about 1/16 to about 5/16 inch in width.

6. A capacitor as recited in claim 1, 3 or 4 wherein at least one of said electrodes comprises metal foil.

7. A capacitor as recited in claim 1, 3 or 4 wherein both of said electrodes comprise metal foil.

8. A capacitor as recited in claim 1 wherein said second electrode comprises metal foil.

9. A capacitor as recited in claim 1 wherein said second electrode comprises metal foil.

10. A capacitor as recited in claim 1 wherein said predetermined recess distance has a magnitude greater than about ⅜ inch.

11. An electrical capacitor comprising:
    first and second elongate strip electrodes alternating with first and seond elongate dielectric strips to form a laminate;
    said first elongate strip electrode comprising a nonconductive strip having metal deposited on opposite surfaces thereof;
    said second electrode comprising a metal foil strip;
    each of said strips having first and second substantially parallel, opposite, longitudinal edges;
    said strips being wound in the shape of a roll such that said first longitudinal edge of said first electrode defines a first end of said roll as a plane, and said second longitudinal edge of said second electrode defines a second roll end as a plane opposite said first end plane and substantially parallel thereto, said first longitudinal edge of said second electrode being recessed a predetermined distance from said first end plane, said second longitudinal edge of said first electrode being recessed from said second end plane;
    said first strip of dielectric material being interposed between said electrodes and being defined by first and second longitudinal borders recessed from said first and second end planes respectively;
    a fold including said first border, said fold being positioned substantially within said predetermined recess distance of said first edge of said second electrode from said first end plane;
    a conductive coating applied to a limited area of each of said planar roll ends, each of said coatings establishing an electrical connection with the edge which defines the corresponding roll end, said fold being adapted to shield said second electrode from stray particles attributed to the application of said coating to said first roll end;

said predetermined recess distance being greater than about ⅜ inch; and connecting leads affixed to said roll, each in electrical contact with one of said coatings.

12. A capacitor as recited in claim 11, wherein:
said dielectric strips comprise synthetic resin;
said nonconductive strip electrode comprises Kraft paper having metal deposited on opposite surfaces thereof; and
said metal foil strip electrode comprises aluminum foil.

13. A capacitor as recited in claim 11 or 12 wherein said predetermined recess distance is in the range of about ⅛ to about 7/16 inch.

14. A capacitor as recited in claim 13 wherein said dielectric strips comprise polypropylene.

15. A capacitor as recited in claim 11 wherein said fold is positioned substantially between said coating and said first edge of said second electrode spaced about 1/16 inch from said second electrode, said fold being from about 1/16 to about 5/16 inch in width.

16. A capacitor as recited in claim 11 wherein said fold is formed by doubling said first border back about 180° toward said foil electrode.

17. A capacitor as recited in claim 11 wherein said strip of dielectric material interposed between said electrodes further comprises a second fold including said second border, each of said first and second folds being positioned substantially within said recess distance of said strip electrode edges from their corresponding end planes, said folds being adapted to shield said first and second electrodes from stray particles attributable to the application of said coatings to said second and first end planes respectively.

18. A capacitor as recited in claim 17 wherein said first fold is positioned substantially between said coating on said first roll end and said first edge of said second electrode spaced about 1/16 inch from the latter edge, and said second fold is positioned substantially between said coating on said second roll end and said second edge of said first electrode spaced about 1/16 inch from the latter edge.

19. A capacitor as recited in claim 18 wherein each of said folds is about 1/16 to about 5/16 inch in width.

20. An electrical roll capacitor comprising in combination:

an elongate strip electrode comprising Kraft paper having metal deposited on opposite surfaces thereof and including first and second opposite, substantially parallel, longitudinal edges;

an integral elongate self-supporting aluminum foil strip electrode including first and second opposite, substantially parallel, longitudinal edges;

first and second elongate strips of polypropylene dielectric material;

said pair of strip electrodes being interleaved with said dielectric strips to form a roll laminate such that only one each of said dielectric strips lies between said electrodes;

said dielectric strips having first and second longitudinal borders substantially parallel to said edges, said first longitudinal edge of said metallized paper strip extending beyond the other layers of said rolled laminate in an axial direction to define a planar first roll end, and said second longitudinal edge of said aluminum foil electrode extending beyond the other layers of said rolled laminate in an axial direction to define a planar second roll end opposite and substantially parallel to said first roll end, said first longitudinal edge of said foil electrode being recessed about ⅜ to 7/16 inch from the plane of said first roll end, said second longitudinal edge of said doubly metallized electrode being recessed a predetermined recess distance from the plane of said second roll end;

said first longitudinal border of said first dielectric strip being doubled over up to about 180° toward said aluminum strip electrode to form a fold about 1/16 to 5/16 inch in width, said fold being spaced about 1/16 to ⅛ inch from said first end plane and about 1/16 to ¼ inch from said first longitudinal edge of said aluminum strip electrode;

a conductive metal coating covering a limited area of each of said roll ends, each of said coatings establishing an electrical connection with the electrode edge which defines the plane of the corresponding roll end; and a pair of connecting lugs affixed to said roll each in electrical contact with one of said metal coatings.

21. A capacitor as recited in claim 20 wherein said roll is impregnated with a dielectric liquid;
a fluid-tight casing surrounds said roll; and
a pair of terminals on said casing are connected respectively to said lugs.

* * * * *

UNITED STATES PATENT AND TRADEMARK OFFICE
CERTIFICATE OF CORRECTION

PATENT NO. : 4,480,285
DATED : October 30, 1984
INVENTOR(S) : Frederic W. Grahame It is certified that error appears in the above-identified patent and that said Letters Patent is hereby corrected as shown below:

Column 4, line 57, change "19B" to --19A--.

Column 7, line 4, change "and" to --end--.

Column 8, lines 32 - 33, delete Claim 9.

Column 8, line 39, change "seond" to --second--.

Column 10, line 30, before "predetermined" insert --second--.

Signed and Sealed this

Seventeenth Day of September 1985

[SEAL]

Attest:

Attesting Officer

DONALD J. QUIGG

Commissioner of Patents and Trademarks—Designate